9 Sheets—Sheet 1.

S. T. THOMAS.
Loom.

No. 236,110. Patented Dec. 28, 1880.

WITNESSES.
George B. Haskell.
J. W. Porter

INVENTOR.
Samuel T. Thomas
By Eugene Humphrey,
his Attorney.

S. T. THOMAS.
Loom.

No. 236,110.

9 Sheets—Sheet 4.

Patented Dec. 28, 1880.

WITNESSES.
George B. Haskell.
J. W. Porter

INVENTOR.
Samuel T. Thomas
By Eugene Humphrey
his Attorney

S. T. THOMAS
Loom.

No. 236,110.

9 Sheets—Sheet 5.

Patented Dec. 28, 1880.

WITNESSES.
George B. Haskell.
J. W. Porter

INVENTOR
Samuel T. Thomas
By Eugene Humphrey
his Attorney

S. T. THOMAS.
Loom.

No. 236,110. Patented Dec. 28, 1880.

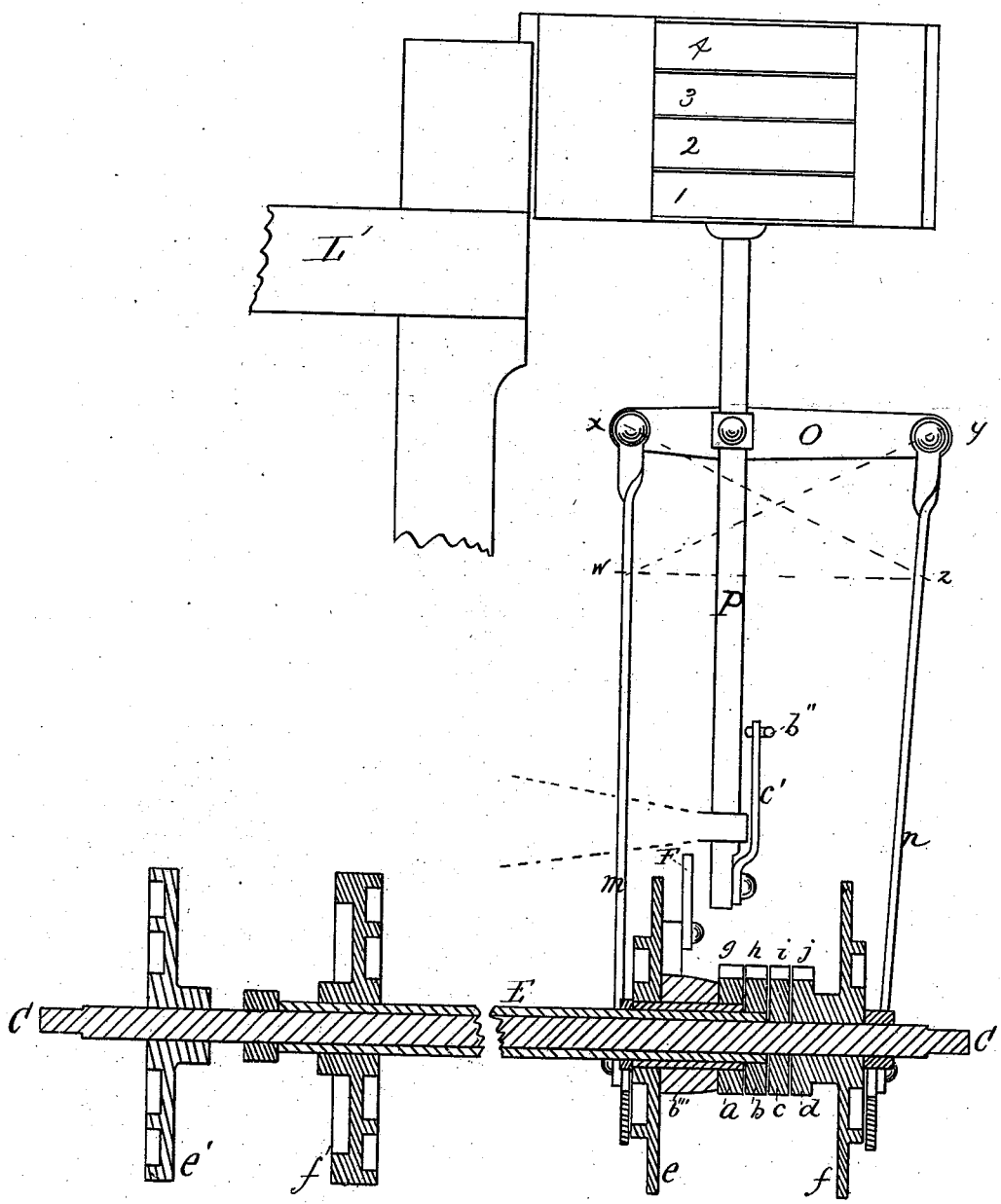

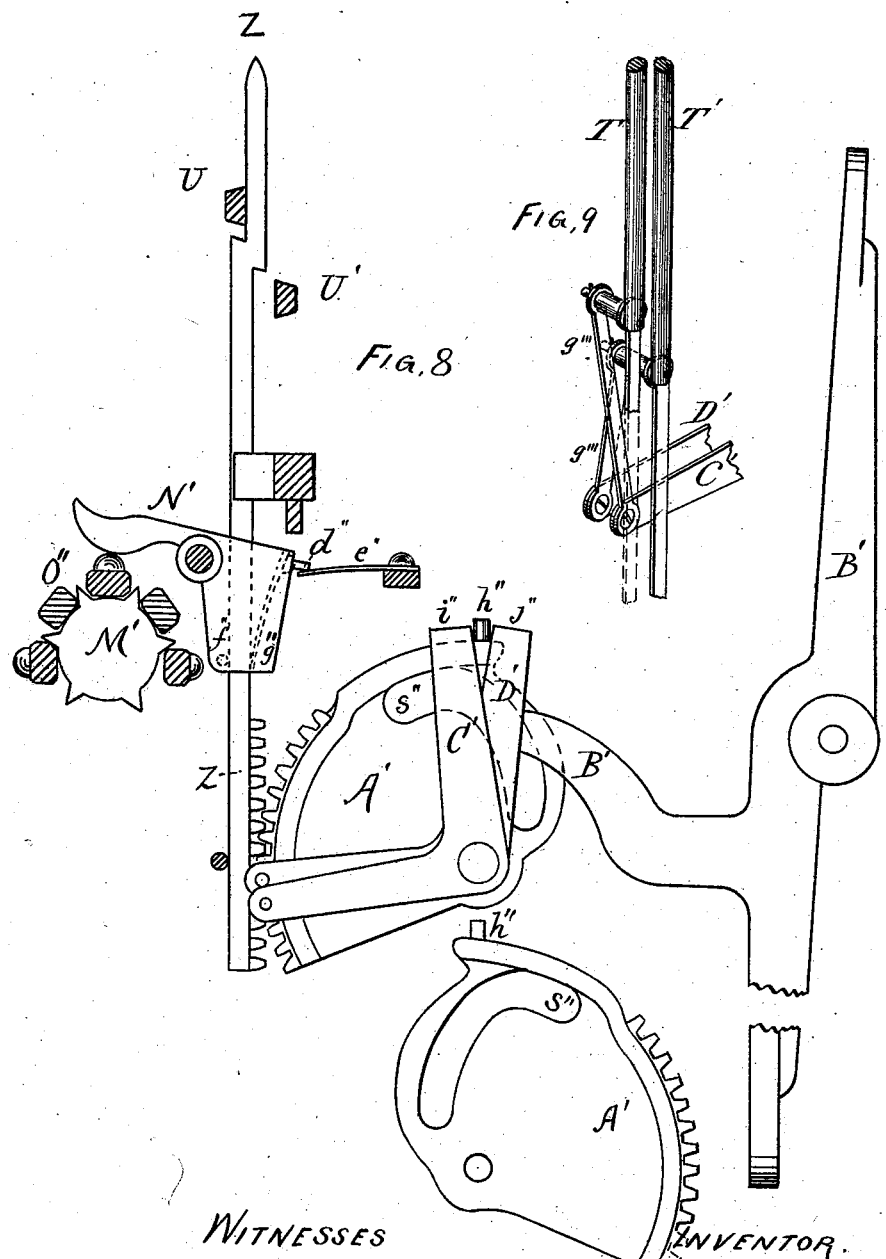

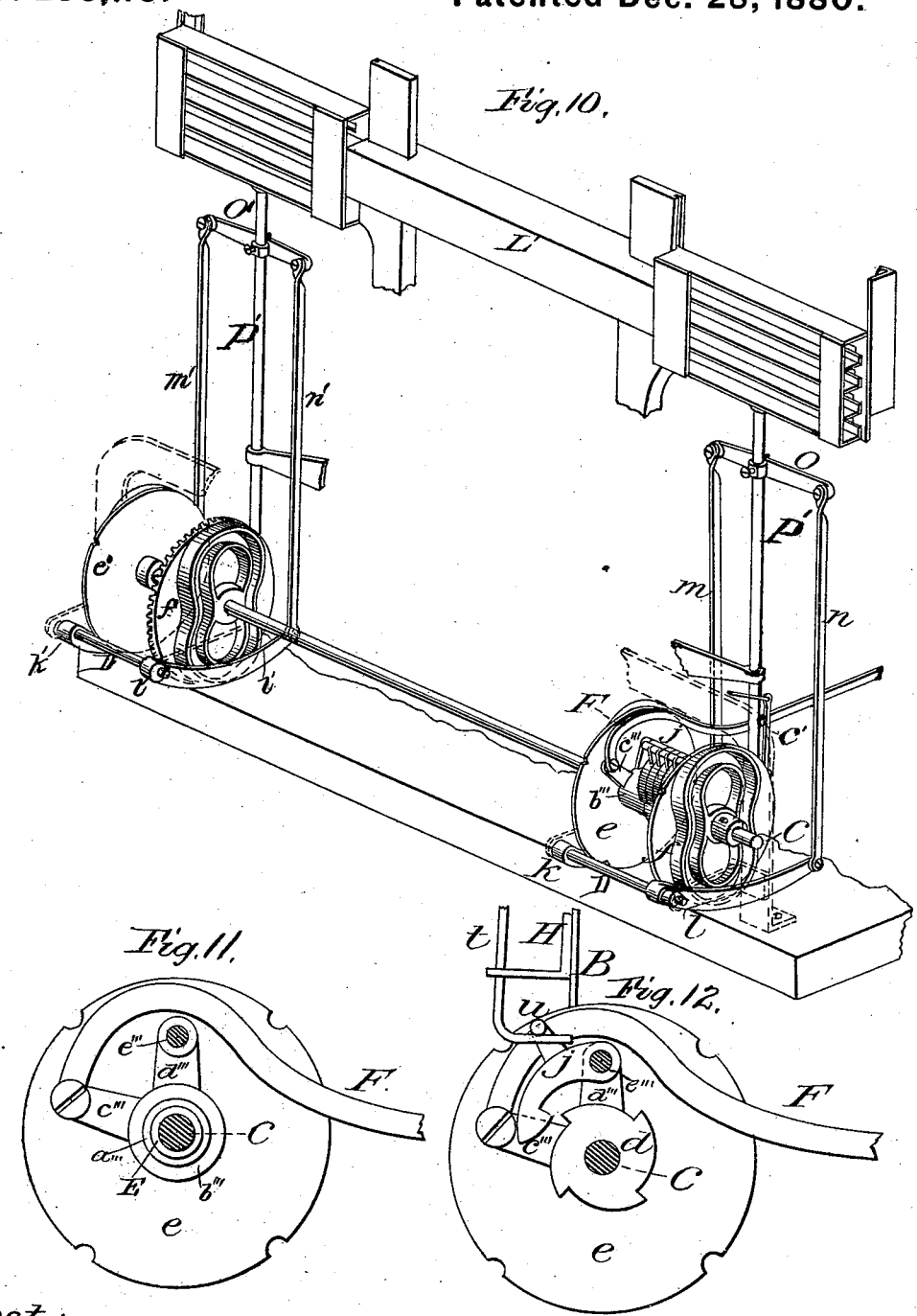

UNITED STATES PATENT OFFICE.

SAMUEL T. THOMAS, OF BOSTON, MASSACHUSETTS.

LOOM.

SPECIFICATION forming part of Letters Patent No. 236,110, dated December 28, 1880.

Application filed April 27, 1878.

*To all whom it may concern:*

Be it known that I, SAMUEL T. THOMAS, of Boston, in the county of Suffolk and State of Massachusetts, have invented a new and useful Improvement in Looms, which invention is fully set forth in the following specification, reference being had to the accompanying drawings.

My present invention relates to that class of looms whose shuttle-box and harness movements are automatically governed by a pattern mechanism, and to such as are termed "close-shed" looms; and my invention consists in certain new devices and new combinations and arrangements of mechanism for operating the shuttle-boxes of a loom, in conjunction with a controlling pattern mechanism; in a stop mechanism for preventing a change of boxes when the filling is broken or run out; also, in certain new devices and new combinations and arrangements of mechanism for operating the harness, in conjunction with a pattern mechanism.

The invention further consists in an improved mechanism for evening the harness and closing the shed, all as hereinafter fully described.

Figure 1:
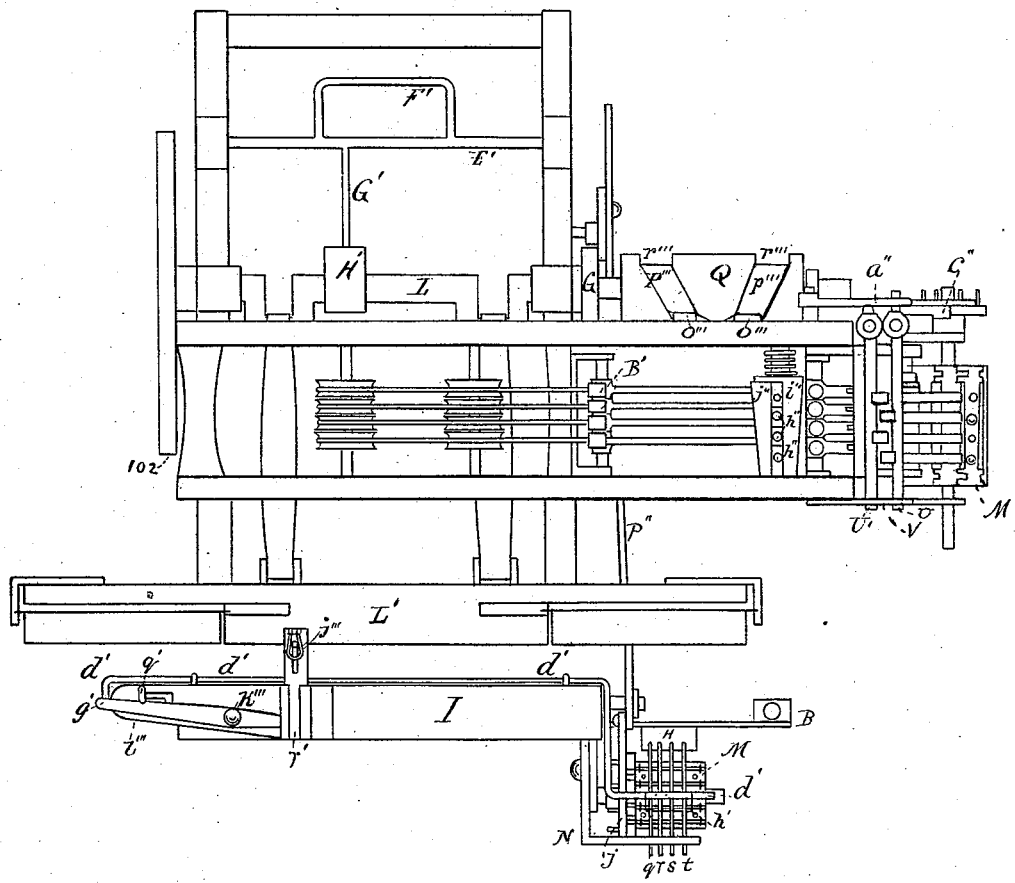
Figure 2:
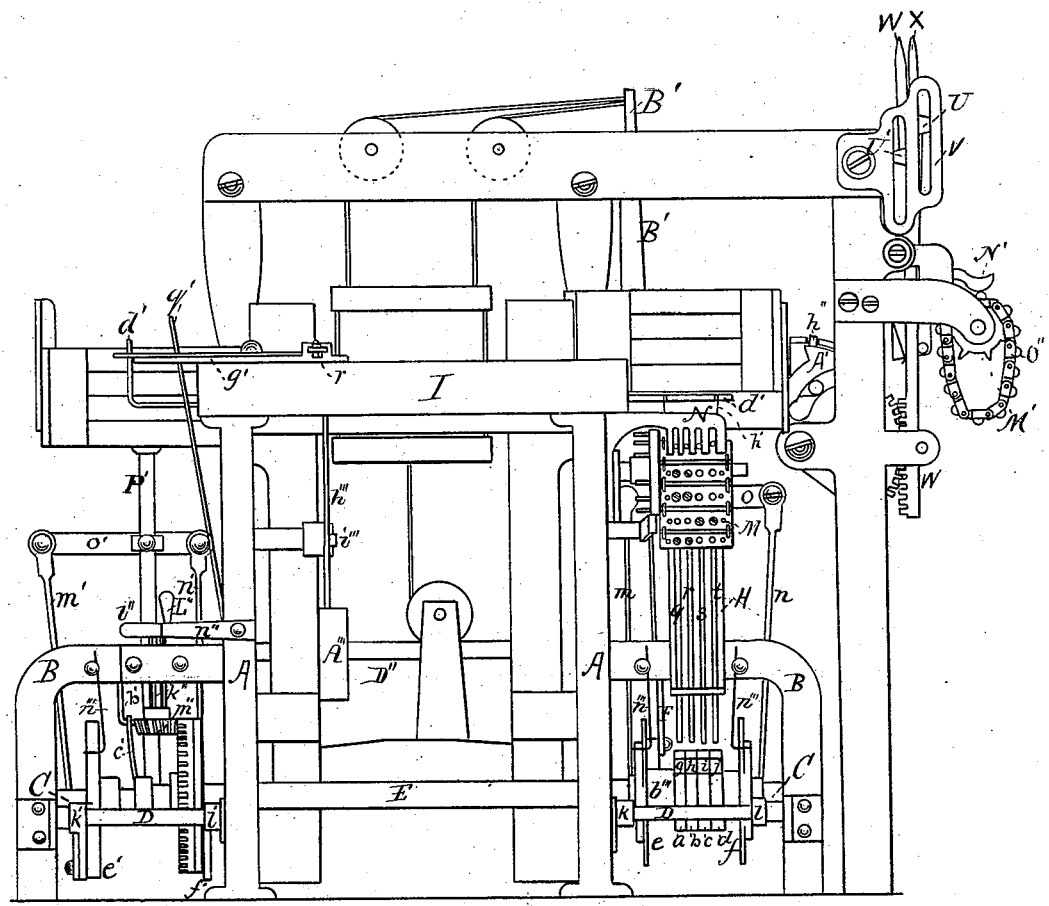
Figure 3:
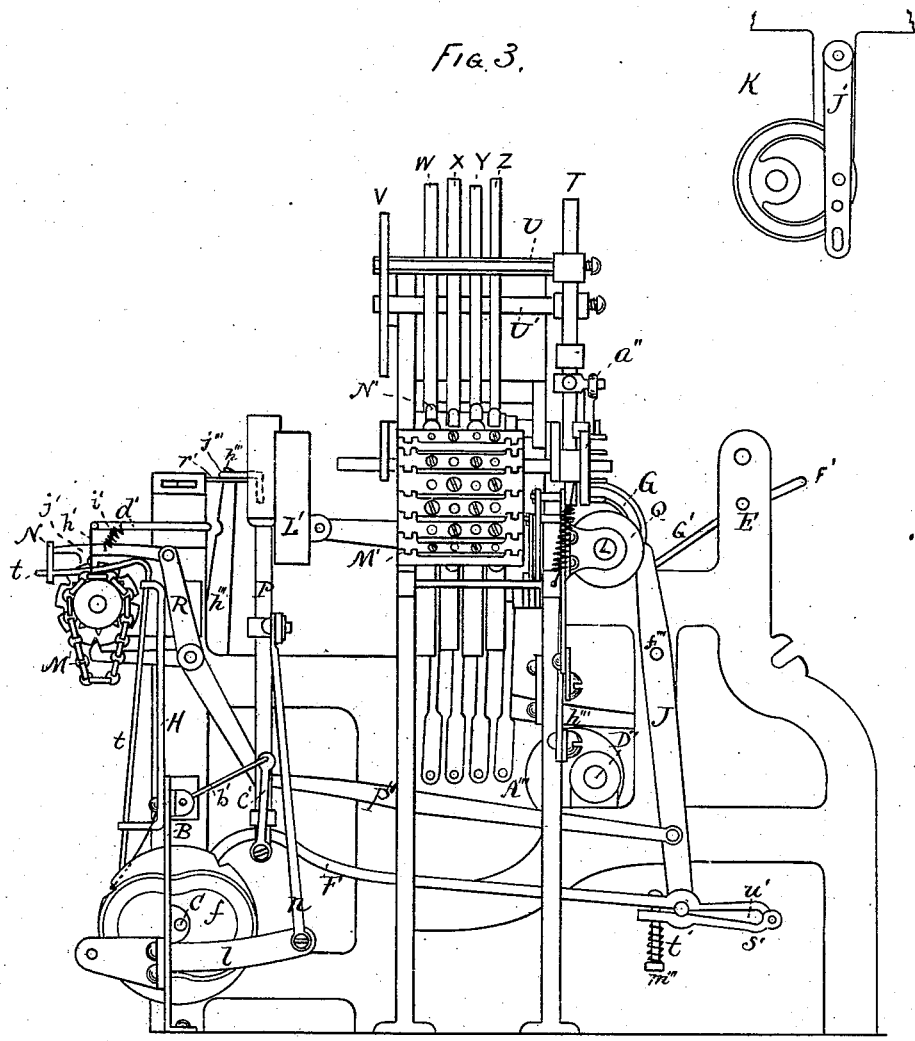
Figure 4:
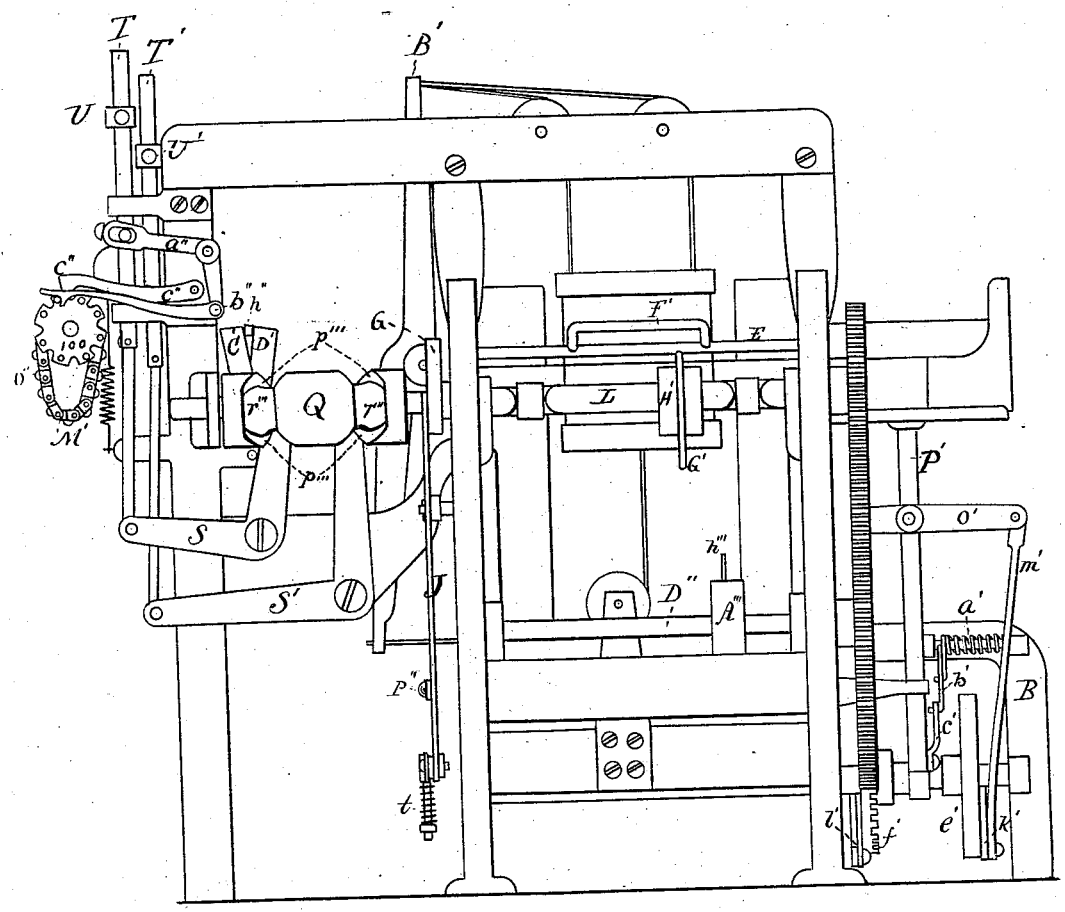
Figure 5:
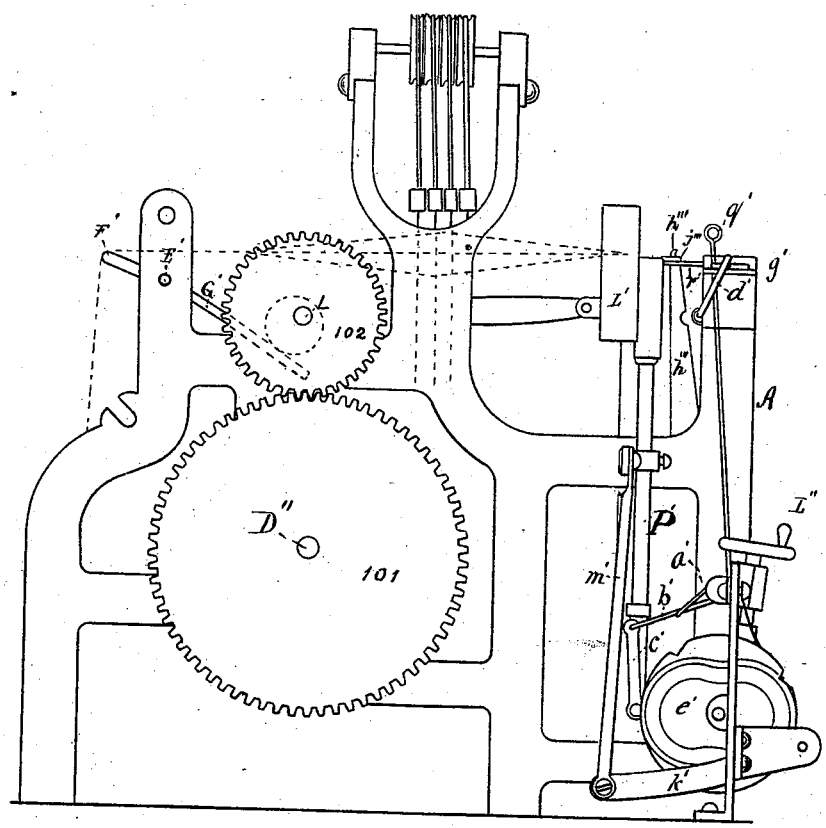
Figure 6:
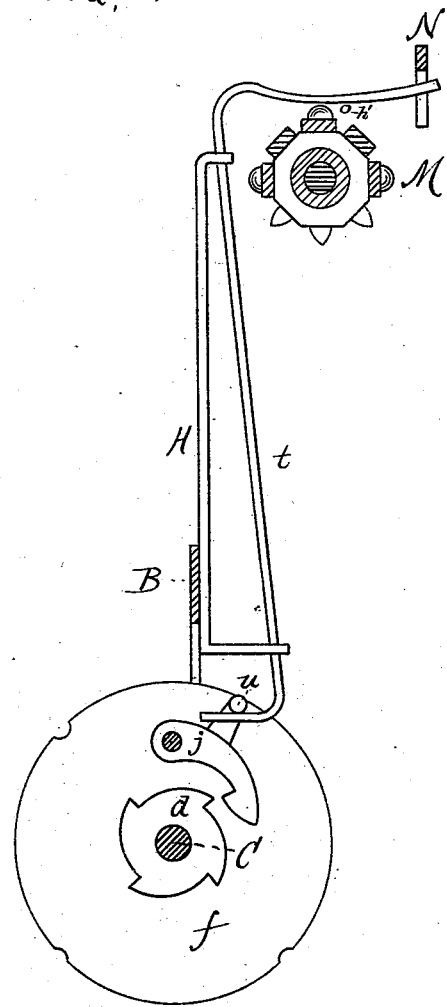

In the accompanying drawings, Figure 1 is a top view or plan of a loom containing my improvements, omitting the main portions of the box mechanism. Fig. 2 is a front elevation of the same, including the box mechanism. Fig. 3 is an end elevation viewed from the right of Fig. 2. Fig. 3* is a detached elevation showing a modification for transmitting motion to the shuttle-boxes from shaft D. Fig. 4 is a rear elevation. Fig. 5 is an end elevation viewed from the left of Fig. 2. Fig. 6 is a detached view of a portion of the pattern mechanism and box-operating devices. Fig. 7 is another detached view of some of the devices for operating the boxes. Fig. 8 is a detached view of a portion of the harness-operating devices, and showing a rear elevation of the evening-levers. Fig. 9 is a detached perspective view of the vertical rods which carry the lifting and depressing bars that actuate the jacks and of the links by which the levers of the positive harness-evener are connected with said rods, the ends of such levers being also shown. Fig. 10 is a detached perspective view of the lathe and shuttle-boxes and the devices by which said boxes are actuated, the central shaft being shown, but the hollow shaft omitted. Fig. 11 is a detached vertical section and elevation taken as between ratchet-wheels *b c*, (see Fig. 7,) and as looking to the left, the central shaft, C, being shown in transverse section, ratchets *a b* being removed or not shown, and the hollow shaft E, cam *e*, and its hub or sleeve *a'''* and hub *b'''*, and a part of rod F being severally shown in end elevation. Fig. 12 is a view similar to Fig. 11, but showing the ratchet-wheel *d* on shaft C, the latter shown in transverse section, and pawl *j* as pivoted on the pawl-pivotal bar *e'''*, (shown in transverse section,) and the lower portion of one of the pawl-controlling rods shown in elevation.

I will first describe my improved mechanism for operating and controlling the movements of the boxes.

Upon the front of the loom, Fig. 2, and attached to the sides A of the frame, are two supplemental frames, B, which furnish bearings for the outer ends of a shaft, C, extending from side to side across the loom, while short arms, projecting to the front from frames B, support short shafts D.

Upon the shaft C, and extending beyond the sides A A of the main frame, is a sleeve, E, (see Figs. 2, 7, 11,) which serves the purposes of a shaft, as hereinafter described. On the right-hand side of the loom, between frames A and B, (see Figs. 2, 7, 10,) are arranged centrally in relation to shaft C, and in the manner to be described, the two cam-wheels *e f* and the four ratchet-wheels *a b c d*, each of the latter being formed with four equidistant peripheral teeth. (See Fig. 12.) Cam *e* is formed with or is rigidly secured upon a sleeve-like hub, *a'''*, (shown marked in Fig. 11 and unmarked in Fig. 7,) and turns loosely upon the sleeve E. Cam *f* has a shorter hub (see Fig. 7) and turns loosely upon shaft C.

On the hub of cam *e* turns a sleeve or hub, *b'''*. (See Figs. 2, 7, 10, 11.) This hub carries the two short arms *c'''* and *d'''*, to the former of which is pivoted the connecting-rod F, while the arm *d'''* carries a horizontal bar, *e'''*, on which are pivoted the ratchet-pawls *g h i j*. (See Figs. 2, 7, 11, 12.) Ratchet *a* is secured to the hub of cam *e*, ratchet *b* to the sleeve or hollow shaft E, ratchet *c* to shaft C, and ratchet $d$ is secured to or formed upon the hub of cam $f$. The pawls $g$ $h$ $i$ $j$ are regularly reciprocated forward and backward by the action of cam G, secured on the revolving crank-shaft L, (see Figs. 1, 3,) which cam actuates its engaging pivoted lever J, Fig. 3, which, at its lower end, is connected with rod F, which latter is connected with stud or rod $e'''$, Figs. 7, 10, 11, 12, on which rod $e'''$ said pawls are pivoted, as before stated. Cam G has such throw, and lever J such relative lengths above and below its pivot $f'''$, that rod F shall actuate said pawls to such an extent that when they engage the teeth of their respective ratchets the same shall be moved a quarter of an entire revolution, or ninety degrees of a circle.

On the opposite or left-hand end of shaft C is secured cam $e'$, and on the same end of sleeve E is secured the cam $f''$, and it will be apparent that when pawl $g$ actuates its ratchet $a$ the cam $e$ will be actuated to the same extent; when pawl $h$ actuates its ratchet $b$ the sleeve E will be actuated, and thereby cam $f''$ will move coincidently with ratchet $b$ and sleeve E; when pawl $i$ actuates ratchet $c$, then shaft C and its cam $e'$ will be correspondingly actuated, and when pawl $j$ actuates ratchet $d$ the cam $f$ will be actuated.

The devices by which the selection of the pawls to be operative upon their respective ratchets is effected through the action of the pattern-chain, and the devices by and through which the movement of the cams, when so actuated by the pawls through the ratchets, is made to actuate the shuttle-boxes, will, in their regular order, be hereinafter described, and by the described operation of said devices an independent movement may be imparted to the shuttle-boxes at the opposite ends of the loom.

Upon shafts D are pivoted the vibrating levers $k$ $l$ and $k'$ $l'$, which extend backward and at their rear ends are jointed to connecting-rods $m$ $n$ and $m'$ $n'$, whose upper ends are jointed to proportional levers O and O', attached to the box-rods P and P'. Said levers $k$ $l$ and $k'$ $l'$ carry studs and rolls, which project into the grooves in the sides of the cam-wheels $e$ $f$ and $e'$ $f''$, from which they derive their movement and transmit the same, through the connections just described, to the drop-boxes.

The proportional lever O is attached to the box-rod P at a distance of one-third its length from one end, and, consequently, two-thirds its length from its opposite end, and in such manner that it may rock freely upon its connection with said rod. Its operation when moving the boxes is as follows: When the lever O stands at a right angle to the rod P, as shown in Fig. 7, with box 1 standing on a level with the shuttle-race or top of the lathe L', if a quarter of a revolution is given, by the means already described, to the cam-wheel $f$, the end $y$ of lever O will be depressed to the point $z$, while its end $x$ will turn on the pivot by which it is connected to rod $m$ as its fulcrum, and move the rod P down to the extent of one box, bringing box 2 into the place of box 1; but if end $x$ is moved in the same manner by cam $e$, while $y$ turns on the pivot by which it is connected to rod $n$ as its fulcrum, said end will be depressed to $w$, and the rod P will be carried down to the extent of two boxes, thus bringing box 3 into the place of box 1. Now again, if, instead of thus moving the cams independently, they are moved in unison, then both $x$ and $y$ will be carried down to $w$ and $z$, and the rod P will be thereby moved to the extent of three boxes, and box 4 will be brought into the position of box 1. Thus the changes of the boxes are effected, and when like movements are transmitted through the shafts E and C to cam-wheels $e'$ and $f''$, the boxes on that side of the loom are correspondingly changed. To effect these movements in accordance with the requirements of the pattern of the web the following devices are employed, (see Figs. 2, 3, and 6:) Suspended in a vertical support, H, attached to the right-hand frame, B, Fig. 2, are four bent rods, $q$ $r$ $s$ $t$, whose upper arms rest on the pattern-chain M, and are guided in the slotted brace N, while their lower ends are bent to receive the studs $u$, Fig. 6, which are attached to the ratchet-pawls, and are carried onto said wires at every forward movement of the pawls, as shown in said Fig. 6. When thus carried forward onto the lower ends of the rods, if a rod rests at its upper end upon a screw in a link of the pattern-chain, as shown in Fig. 6, then, when the backward movement of the pawl takes place, it will not engage with the tooth of its ratchet-wheel, it being suspended by said rod, as shown, out of range of said tooth, and consequently no movement of the cam-wheel to which such ratchet is connected will take place; but if such rod does not rest upon a screw in the pattern-chain, then the pawl will not be held out of range of its ratchet-tooth during its backward throw, and a movement of the cam-wheel will consequently be thereby effected. The pattern-chain is hung in the usual manner upon a wheel or rotary prism, which is suitably actuated by a pawl-lever, R, Fig. 3, which is connected by rod $p''$ to the lever J, whereby cam G actuates the pattern-chain as well as the shuttle-boxes.

On the back of each frame B, Figs. 3 and 4, is attached a rod, around which a spiral spring, $a'$, is coiled, and from which extends an arm, $b'$, which is connected to the box-rod by a link, $c'$. The free end of the spring extends outward and rests against the under side of arm, $b'$, and by its elastic force counterbalances the weight of the boxes, and thereby facilitates the promptness and accuracy of their movements.

To suspend the action of the boxes and their pattern-chain when the filling has broken or run out, I employ a bent rod, $d'$, secured in eyes on the back of beam I, Figs. 1, 2, and 3, one end of which is bent up so as to rest against the lever $g'$, while the opposite end is bent forward, and then at a right angle extended out over the pattern-prism. To this end is attached a bent wire, $h'$, Figs. 2, 3, and 6, which forms a loop that passes beneath the suspending-rods $q\ r\ s\ t$, so that when this end of rod $d'$ is elevated it will raise said suspending-rods. It will also, acting through a spring, $i'$, raise the pawl $j'$, which actuates the pattern-chain, and thus, by keeping the pawl $j'$ out of contact with its wheel, the pattern-chain is prevented from moving during the absence of the filling, and by thus raising the suspending-rods $q\ r\ s\ t$, Fig. 2, the pawls $g\ h\ i\ j$ are kept from contact with their respective ratchet-wheels, and consequently no movement of the boxes takes place. To effect such elevation of rod $d'$, and consequently of rods $q\ r\ s\ t$, its opposite end is turned up at a right angle and bears against the back edge of the lever $g'$, pivoted at $k'''$, Fig. 1, on breast-beam I. This lever is actuated and actuates rod $d$ in the following manner: The short arm of lever $g'$ engages in slide $r'$, and the lever is thereby actuated when the slide moves. Through this slide, and behind beam I, is an open slot, in which the diminished end of the vertical arm of the angle-lever $h'''$ vibrates in a vertical plane. This lever is pivoted on stud $i'''$, and is actuated by eccentric $A'''$, which is carried on shaft $D''$, Figs. 2, 3, 4, 5, the longer and horizontal arm of the lever resting upon and being actuated by the eccentric.

The weft-fork $j'''$, Figs. 1, 3, is pivoted at the angle of intersection of its tines and loop in the rear end of slide $r'$, and the front portion or arm forms a loop resting upon or over the slide, as shown in Fig. 1. The rear end or tines (shown by dotted lines in Fig. 3) are bent downward at a right angle to the loop portion, and enter between the threads of the warp, so as to be engaged by the filling-threads when extended through the open shed of the warp by the flight of the shuttle therein, which threads swing such tines forward and elevate the loop or horizontal portion above the end of lever $h'''$, which, when so elevated, will not engage the arm of the lever, which in such case moves in the slot in slide $r'$ without actuating the same. But should the filling run out or be broken, then, the vertical tines of the fork being thereby disengaged, the loop which is the heaviest will fall upon slide $r'$, and the forward movement of the point of lever $h'''$ causing it to engage with the loop, the slide will be carried forward, thereby forcing the long or outer arm of lever $g'$ backward, taking with it the vertical arm of rod $d'$, which is thereby rocked or rotated in its bearings, and elevates the angle-arm at the opposite end, which carries loop $h'$, thereby elevating the rods $q\ r\ s\ t$, which, in turn, lift the pawls $g\ h\ i\ j$ out of contact with the ratchets $a\ b\ c\ d$, and the chain-pawl $j'$ is, by spring $i'$, lifted from the ratchet 100 on the shaft of the chain-prism by the same action of rod $a'$. The rod $d'$, lever $g'$, and the usual shipper-rod $q'$ are all so constructed and arranged that the greater motion of the lever, where it encounters the upturned end of rod $d'$, will cause this rod to lift rods $q\ r\ s\ t$ and the chain-pawl $j'$ before the shipper $q'$ is released from its holding-notch in plate $l'''$, secured to beam I, so as to stop the loom.

In case of any accidental obstruction to the vertical movement of the shuttle-boxes by a failure of the picker-action, or otherwise, to avoid serious breakage of the loom or other damage therefrom, the connector F is attached to the cam-lever J, Fig. 3, by a yielding spring-joint, as shown, the long arm of the connector being pivoted to the short arm $s'$, which is held in contact with the stud of lever J by the force of spring $t'$, supported upon a stud secured in the long arm of connecting-rod F, as shown. The force of this spring is sufficient to keep the connecting-rod in place on its stud in lever J during the ordinary and proper operations of the loom; but in case of accident, as before stated, then the spring will yield and allow the end of lever J, to which the connecting-rod is attached, to move with its stud in the opening $u'$ between the arms of the connecting-rod, where sufficient room is allowed for it to do so without actuating the same or unduly straining upon the same, and thereby causing damage to the loom.

The loom, organized as shown in Fig. 3, with cam G upon the crank-shaft L, will effect a change of boxes at every "pick" or throw of the shuttle; but when a change of boxes is required only at every other pick, or after the shuttle has returned to the side from which it was thrown, the extra cam (shown with its connecting-lever at K, Fig. 3*) is placed upon shaft $D''$, which makes only half the number of revolutions of the crank-shaft L, and is connected by the short lever $J'$ with connecting-bars F and $P''$, in the same manner as with lever J. Such difference in the relative revolutions of shafts D and L results from the relative diameters of the enmeshing gears thereon, gear 101 on shaft D being of twice the diameter of gear 102 on shaft L, Figs. 4, 5, and rotation being thereto imparted through shaft L by means of a pulley secured thereon in the usual manner.

To enable the operator to conveniently raise and lower the boxes for any purpose independent of the action of the loom, I provide a vertical shaft, $k''$, (shown only on the left of Fig. 2,) having a wheel and winch, $l''$, on its upper end, and a pinion, $m''$, at its lower end, which works in the toothed cam-wheel $f'$. One revolution of said winch produces a quarter revolution of cam-wheel $f'$ and a movement of the boxes corresponding to the leverage of lever $O'$, through which such cam operates on the box-rod. Such hand-wheels are provided for each cam-wheel, but only one is shown. There is a notch in the edge of the winch-wheel, into which a spring-detent, $n''$, rests to prevent the wheel from being accidentally turned.

I will now describe the mechanism which I employ for operating the harness and evening the leaves thereof on a "close shed."

Upon the crank-shaft L, Figs. 1 and 4, is a cam, Q, which operates, through the bell-crank levers S S', the two vertical rods T T', which work in bearings attached to the frame of the loom, as shown in Figs. 3 and 4. These vertical rods carry the lifting and depressing bars U U', Fig. 3, whose opposite ends work in a slotted guide-plate, V, attached to the frame of the loom, Fig. 2. These lifting and depressing bars operate the vertical jacks W X Y Z, Fig. 3, which gear into a corresponding number of toothed cam-sectors A', Figs. 2 and 8, which operate the harness-levers B', to the upper and lower ends of which the leaves of the harness are attached by cords running over pulleys, as shown. The cam Q is so grooved that it operates said rods T T' in relatively opposite directions—that is, one goes up while the other goes down—and it also has a "dwell," or, during a certain portion of its revolution, does not produce any rocking motion of the levers S S'. This rest or dwell takes place on the open shed and while the shuttle is passing through from box to box, thereby avoiding the closing of the warp upon the shuttle during its flight, and also upon the filling, thus preventing a variation of the tension upon the latter, which, in some cases, injuriously affects the weaving of the fabric.

The jacks W X Y Z are notched or formed with shoulders, as clearly shown in Fig. 8, against which shoulders the lifting and depressing bars U U' act accordingly as the pattern mechanism controls the inclination of said jacks and places their shoulders within range of said bars; and to effect such selection of the jacks for an upward or downward movement the operation of the pattern mechanism is as follows:

Upon the pattern wheel or prism M', Figs. 4 and 8, the pattern-chain for controlling the action of the harness is carried. This wheel is actuated by bar T, through angle-lever $a''$ and pawl $b''$, which latter acts upon the pin-wheel 100, which is rigidly secured upon the shaft that carries the chain-prism M', and held in position by detent $c''$, which, at the proper time, takes into notches in the periphery of said wheel, Fig. 4.

In front of each of the jacks W X Y Z is placed upon a shaft a rocking-lever, N'. (Shown clearly in detached view, Fig. 8.) One end or arm of this lever extends outward over the pattern-chain, while the portion on the opposite side of its fulcrum extends backward and downward between the jacks, and at its rear is provided with a projection, $d''$, against which a spring, $e''$, acts to keep its forward end in contact with the pattern-chain O''. At the lower extremity of this lever, and in front of the jack, is a pin, $f'''$, which acts against the jack, by force of said spring, to move it in one direction, and behind the jack (shown in dotted lines) is a curved spring, $g''$, which moves the jack in the opposite direction, and this movement of the jacks is governed entirely by the position of the rocking levers upon the pattern-chain. If the lever rests upon a screw or pin in the chain, as shown, then the spring $g''$ will force the jack corresponding to such lever forward, so that its shoulder will come within the range of bar U, and the jack will consequently be depressed by the downward movement of such bar; but if the lever rests upon a bar of the chain, then such jack will be forced by spring $e''$, acting through the lever and pin $f'''$, backward, so that its shoulder on that side will come within the range of bar U', and thus be lifted by the upward movement of said bar. This vibrating movement of the jacks, so produced by the pattern-chain, takes place when bar U is nearly at its highest point and bar U' at its lowest position, and while the jacks are free from the vertical action of said bars, and the shed is closed and the jacks leveled by the evener, to be described. The jacks, moved as described, produce the proper corresponding movements of the leaves of the harness in opening the shed through the toothed cam-sectors A', acting, by means of a curved slot, $s''$, on the harness-levers B', connected with the harness by cords, as described and shown.

The positive and accurate harness-evener consists of the angle-levers C' D', Fig. 8, which rock upon the same shaft with the sectors A'. Said sectors are provided with projections $h''$, and said levers with horizontal arms $i''$ $j''$, Fig. 1. The opposite ends of said levers C' D' are attached by links $g'''$ $g'''$ to bars T T' (see Fig. 9) in such manner that, when the lifting and depressing bars are acting upon the jacks to raise or lower them the arms $i''$ and $j''$ are moved apart enough in advance of the movement of the projection $h''$ so as not to interfere with the free action of the sectors under the operation of the jacks; and as the bars U and U' return to their respective starting positions, leaving the jacks free from their vertical action, the arms $i''$ $j''$ also return by the same means, moving against the projections $h''$, and thereby bring the sectors, jacks, and harness into their respectively level or even positions again, and thus close the shed.

In order that the harness shall be held at an open shed during the entire flight of the shuttle, the cam Q, through which motion is imparted to the harness, is formed with the lines $P'''$ $P'''$ oblique to its axis, as shown in Figs. 1 and 4, (such lines being duplicated on opposite sides of the shaft,) and with the lines $r'''$ $r'''$ at right angles to its axis, as shown in said figures, such transverse lines constituting the continuation of and uniting the respective oblique lines at the point of greatest divergence. Such oblique grooves acting upon rollers $o'''$ $o'''$ of angle-levers S S' serve, as shaft L revolves, to open and close the shed by a very rapid movement, while the transverse lines $r'''$ allow the harness to dwell or remain stationary while the shuttle performs its flight.

To avoid putting an undue and uneven tension upon the warp-threads when opening the shed, and thus to secure better results in weaving nice fabrics, I employ what I term a "compensator," which consists of a rock-shaft, E', (clearly shown in Fig. 1,) having a bent arm, F', over which the warp passes from the beam through the harness, and also a straight arm, G', which rests under and against a cam, H', on the crank-shaft L. Cam H' is so formed and placed upon said driving-shaft that its movement relatively to the movements of the harness, and its action against arm G' is such that as the threads of the warp are separated on opening the shed, the arm F', over which they are drawn, is rocked, with its shaft E', so that it correspondingly slackens the warp to supply the increased length requisite for such opening of the shed without producing additional strain or tension thereon; and when the shed closes again and yields back the extra length required for opening the shed, said arm is again rocked by said cam H' in corresponding time and to the proper extent to take up the slackness which would otherwise be produced on the warp, and thus maintains the uniform tension thereon which exists between the take-up and let-off devices of the loom, and thus produces an important effect in the weaving of nice fabrics.

It will be readily apparent to those skilled in this art that a great variety of modifications may be employed by which to actuate boxes carrying any desired number of shuttles, by means of the solid and hollow shafts, the pawls, ratchets, cams, cam-levers, connecting-rods, and the proportional levers secured to the box-rods, and arranged as shown and herein described. One easy method would be an increase in the number of teeth and in the size of the ratchets that actuate the shafts and cams.

The spring-detents $n''$, that engage the hand-wheel $l''$ on shaft $k''$, are arranged so as to be swung out of contact with the hand-wheel when the loom is operative, if desired, in which case the spring-detents $n'''$ may be employed, as shown in Fig. 2, in direct contact with the cams, by entering recesses in the periphery thereof, corresponding with the teeth of the cam-ratchets, as shown in Fig. 6.

I do not claim, broadly, the solid and hollow shafts in a shuttle-box-operating mechanism; nor do I claim, broadly, a proportional lever in combination with the box-rods of a loom, as I only claim said shafts in combination with the peculiar devices with which they coact in my loom in transmitting the imparted power to the shuttle-boxes to actuate the same.

What I claim as my invention is—

1. In combination, the shuttle-box-supporting rods P P', the proportional levers O O', respectively pivoted thereon, the connecting fulcrum-rods $m$ $n$ and $m'$ $n'$, respectively pivoted to the arms of said levers, and the levers $k$ $l$ and $k'$ $l'$, and mechanism for moving them independently of each other, all substantially as specified.

2. The combination of cam G, shaft L, pivotal lever J, connecting-rod F, the common pawl-carrier $e'''$, pawls $g$ $j$, ratchets $a$ $d$, cams $e$ $f$, and pattern mechanism, as described, to control the same, substantially as specified.

3. The shaft C and hollow shaft E, the cams $e'$ $f$, and ratchets $b$ $c$, respectively secured thereto, the cams $e$ $f$, with their actuating-ratchets, levers $k$ $l$ and $k'$ $l'$, shuttle-box rods and connecting mechanism, as described, combined with a series of actuating-pawls corresponding to such ratchets, and pattern-chain mechanism whereby an independent movement may be imparted to the shuttle-boxes at the opposite ends of the loom, substantially as specified.

4. The combination of cam G, shaft L, pivotal lever J, connecting-rod F, the pawl-carrier and pawls, the shuttle-box-actuating devices moved by the pawls, and rod P'', pivotal lever R, pawl $j'$, and pattern-cylinder provided with pin-wheel 100, substantially as specified.

5. The combination of the weft-fork $j'''$, slide $r'$, vibrating lever $h'''$, and mechanism for operating such lever, lever $g'$, rod $d'$, pawl $j'$, and the pawl-controlling rods $q$ $r$ $s$ $t$, all substantially as specified.

6. The combination of a shuttle-box rod, the coiled spring $a'$, mounted upon a horizontal rod, the arm $b'$, and stirrup $c'$, pivoted to the box-rod and arm $b'$, substantially as specified.

7. A series of jacks having the racks, as shown, geared sectors A', provided with projections $h''$, in combination with pivotal levers C' D', provided with arms $i$ $j$, and actuating mechanism, substantially as specified.

8. A jack provided with a rack, as described, toothed sector A', provided with its projection $h''$, and a pivotal harness-lever, B, in combination with the evening-levers C' B', provided with arms $i''$ $j''$, rods T T', and links $g'''$, and mechanism to actuate the said devices, substantially as specified.

9. A series of toothed sectors provided with projections $h''$, a pair of evening-levers C' D', provided with arms $i''$ $j''$, a corresponding series of jacks provided with toothed parts, and mechanism for actuating said jacks and evening-levers, in combination with pattern mechanism for controlling the movements of said jacks, all operating together, substantially as and for the purposes specified.

SAMUEL T. THOMAS.

Witnesses:
EUGENE HUMPHREY,
T. W. PORTER.